United States Patent
Foggia et al.

(10) Patent No.: US 12,437,652 B2
(45) Date of Patent: Oct. 7, 2025

(54) AERIAL VEHICLE DETECTION SYSTEM

(71) Applicant: Flirtey Holdings, Inc., Reno, NV (US)

(72) Inventors: John R Foggia, Reno, NV (US); Allison Jade Malloy, Reno, NV (US); Matthew Sweeny, Reno, NV (US)

(73) Assignee: Flirtey Holdings, Inc., Reno, NV (US)

( * ) Notice: Subject to any disclaimer, the term of this patent is extended or adjusted under 35 U.S.C. 154(b) by 0 days.

(21) Appl. No.: 17/674,249

(22) Filed: Feb. 17, 2022

(65) Prior Publication Data

US 2022/0246041 A1  Aug. 4, 2022

Related U.S. Application Data (63) Continuation of application No. 16/817,441, filed on Mar. 12, 2020, now abandoned, which is a
(Continued)

(51) Int. Cl.
 *G08G 5/22* (2025.01)
 *B64U 101/20* (2023.01)
 *B64U 101/64* (2023.01)
 *G01S 13/04* (2006.01)
 *G01S 13/72* (2006.01)
 *G01S 13/78* (2006.01)
(Continued)

(52) U.S. Cl.
 CPC ............ *G08G 5/22* (2025.01); *G01S 13/04* (2013.01); *G01S 13/726* (2013.01); *G01S 13/781* (2013.01); *G01S 13/91* (2013.01); *G08G 5/55* (2025.01); *G08G 5/57* (2025.01); *G08G 5/80* (2025.01); *B64U 2101/20* (2023.01); *B64U 2101/64* (2023.01)

(58) Field of Classification Search
 CPC .... G08G 5/0026; G08G 5/0069; G08G 5/045; G01S 13/04; G01S 13/726; G01S 13/781; G01S 13/91; G01S 13/93; G01S 13/913; G01S 13/463; G01S 13/956; G01S 13/953; G01S 13/86; G01S 13/89; G01S 13/003
 USPC ........ 342/27, 28, 29, 30, 31, 32, 36, 37, 41, 342/42, 43, 46, 47, 50
 See application file for complete search history.

(56) References Cited

U.S. PATENT DOCUMENTS 3,706,096 A * 12/1972 Hammack ............... G01S 13/66
 342/107
4,782,450 A * 11/1988 Flax ...................... G01S 13/933
 342/32
(Continued)

OTHER PUBLICATIONS

International Search Report and Written Opinion dated Jan. 8, 2019 for PCT Application No. PCT/US2018/050935.

*Primary Examiner* — Michael W Justice
(74) *Attorney, Agent, or Firm* — EIP US LLP (57) ABSTRACT

Embodiments described herein are concerned with system for identifying an aerial vehicle. The system comprises: a radar sub-system, the radar sub-system comprising at least one radar connectable to a static support member and a transceiver configured to transmit data indicative of one or more targets identified by the radar within an airspace; a receiver arranged to receive the data indicative of one or more targets identified by the radar; and a processing system configured to process said data, whereby to identify at least one aerial vehicle. In some embodiments the radar comprises a marine radar.

18 Claims, 8 Drawing Sheets

Related U.S. Application Data continuation of application No. PCT/US2018/050935, filed on Sep. 13, 2018.

(60) Provisional application No. 62/558,167, filed on Sep. 13, 2017.

(51) Int. Cl.
  *G01S 13/91* (2006.01)
  *G08G 5/55* (2025.01)
  *G08G 5/57* (2025.01)
  *G08G 5/80* (2025.01)

(56) References Cited

U.S. PATENT DOCUMENTS

| | | | | |
|---|---|---|---|---|
| 5,629,691 | A * | 5/1997 | Jain | G01S 13/91 |
| | | | | 342/36 |
| 7,006,032 | B2 * | 2/2006 | King | G08G 5/0008 |
| | | | | 342/29 |
| 7,224,308 | B2 * | 5/2007 | Butler | G01S 13/781 |
| | | | | 342/56 |
| 7,259,693 | B2 * | 8/2007 | Miller | G08G 5/0078 |
| | | | | 340/961 |
| 7,477,193 | B2 * | 1/2009 | Evers | G01S 13/878 |
| | | | | 342/463 |
| 7,538,713 | B1 * | 5/2009 | Thomson | G01S 7/006 |
| | | | | 342/60 |
| 7,706,979 | B1 * | 4/2010 | Herwitz | G08G 5/0082 |
| | | | | 701/120 |
| 8,009,081 | B2 * | 8/2011 | Hong | G01S 13/589 |
| | | | | 342/55 |
| 8,368,584 | B2 * | 2/2013 | Askelson | G08G 5/22 |
| | | | | 342/30 |
| 9,405,005 | B1 * | 8/2016 | Arteaga | G08G 5/0013 |
| 9,523,773 | B2 * | 12/2016 | Fink | G01S 19/215 |
| 9,821,910 | B1 * | 11/2017 | Suiter | G01S 13/86 |
| 10,099,609 | B2 * | 10/2018 | Pagliani | G01S 13/865 |
| 10,302,759 | B1 * | 5/2019 | Arteaga | G08G 5/006 |
| 10,345,441 | B2 * | 7/2019 | Batra | G01S 5/0289 |
| 10,453,348 | B2 * | 10/2019 | Speasl | B64F 1/222 |
| 2003/0004641 | A1 * | 1/2003 | Corwin | G01S 13/933 |
| | | | | 701/301 |
| 2005/0156777 | A1 * | 7/2005 | King | G08G 5/0021 |
| | | | | 342/29 |
| 2005/0248480 | A1 * | 11/2005 | Butler | G01S 13/86 |
| | | | | 342/45 |
| 2006/0253254 | A1 * | 11/2006 | Herwitz | G08G 5/55 |
| | | | | 701/3 |
| 2008/0169967 | A1 * | 7/2008 | Wood | G01S 13/723 |
| | | | | 342/90 |
| 2010/0097262 | A1 * | 4/2010 | Hong | G01S 13/867 |
| | | | | 342/52 |
| 2010/0121575 | A1 * | 5/2010 | Aldridge | G08G 5/57 |
| | | | | 701/301 |
| 2010/0315281 | A1 * | 12/2010 | Askelson | G01S 13/91 |
| | | | | 703/2 |
| 2012/0209457 | A1 * | 8/2012 | Bushnell | G08G 5/0078 |
| | | | | 701/13 |
| 2013/0176163 | A1 * | 7/2013 | Margolin | G01S 13/003 |
| | | | | 342/118 |
| 2014/0028485 | A1 * | 1/2014 | Nordlie | G01S 7/22 |
| | | | | 342/36 |
| 2014/0236466 | A1 * | 8/2014 | Doron | G06Q 10/06 |
| | | | | 701/123 |
| 2014/0266851 | A1 * | 9/2014 | Fink | G01S 7/021 |
| | | | | 342/14 |
| 2015/0204973 | A1 * | 7/2015 | Nohara | G01S 7/003 |
| | | | | 342/107 |
| 2016/0001701 | A1 * | 1/2016 | Pagliani | G01S 13/931 |
| | | | | 701/301 |
| 2016/0364989 | A1 * | 12/2016 | Speasl | G08G 5/0082 |
| 2017/0069214 | A1 * | 3/2017 | Dupray | G08G 5/55 |
| 2017/0174343 | A1 * | 6/2017 | Erickson | A61B 5/4815 |
| 2017/0251381 | A1 * | 8/2017 | Buer | H04W 24/02 |
| 2018/0059239 | A1 * | 3/2018 | Batra | G08G 5/80 |
| 2018/0157255 | A1 * | 6/2018 | Halverson | G05D 1/0055 |
| 2019/0019418 | A1 * | 1/2019 | Tantardini | G08G 5/22 |
| 2020/0160728 | A1 * | 5/2020 | Speasl | G08G 5/0069 |
| 2020/0286389 | A1 * | 9/2020 | Speasl | B64F 1/222 |
| 2020/0349853 | A1 * | 11/2020 | Speasl | B64C 39/024 |
| 2020/0410872 | A1 * | 12/2020 | Speasl | G08G 5/0082 |
| 2021/0358311 | A1 * | 11/2021 | Tantardini | G08G 5/55 |

* cited by examiner

AERIAL VEHICLE DETECTION SYSTEM

CROSS-REFERENCE TO RELATED APPLICATIONS

This application is a continuation of U.S. application Ser. No. 16/817,441, filed Mar. 12, 2020, which is a continuation of International Application No. PCT/US2018/050935, filed Sep. 13, 2018, which claims the benefit of U.S. Provisional Application No. 62/558,167, filed Sep. 13, 2017, under 35 U.S.C. § 119(a). Each of the above-referenced patent applications is incorporated by reference in its entirety.

TECHNICAL FIELD

The present invention relates to an aerial vehicle detection system, and has particular, but not exclusive, applicability to detecting aerial vehicles present in the uncontrolled airspace, such as the Class G airspace.

BACKGROUND

Ground control stations track and analyze various aerial vehicles, such as Unmanned Aerial Vehicles (UAVs), airplanes, or helicopters. Aerial vehicles can be tracked by a computer using various tracking technologies. These tracking technologies can generally be classified under either cooperative surveillance technology or non-cooperative surveillance technology. Cooperative surveillance technology includes a device installed on an aerial vehicle that provides information about a vehicle so that air traffic control can track the vehicle. The device installed on an aerial vehicle for cooperative surveillance may include an automatic dependent surveillance-broadcast (ADS-B) transceiver, a Mode-S transceiver, or a Mode-C transceiver, or via other active transmission of identity and position information. The operators of the aerial vehicle with cooperative surveillance technology participate in the collective surveillance of the system by electronically making known certain tracking information, for example, the position and presence of the aerial vehicle. Non-cooperative aerial vehicles do not make known their tracking information, e.g., because these vehicles may operate without onboard transceivers, or the onboard transceivers on these vehicles may have failed, or the onboard transceivers on these vehicles may be inadvertently turned off. Examples of non-cooperative aerial vehicles include crop sprayers, gliders and paragliders, hot air balloons, and UAVs operated by individuals and enterprises ranging from hobbyists to commercial delivery companies. Furthermore, many UAVs are not equipped with onboard imaging technology.

As a result, such UAVs are flying blind and they are typically invisible to other airborne vehicles. And while an operator can control flight of a UAV within the airspace that is visible to the operator, UAVs—in particular those deployed by commercial enterprises—are required to fly beyond line of sight. Even if a UAV is equipped with imaging processing technology for detect and avoid, it is often too late to avoid a collision by e.g. changing course only when a vehicle has been detected. It would be desirable to address these problems.

SUMMARY

Aspects of the present disclosure provide a system, method and computer software according to the appended claims.

A first aspect discloses a system for identifying an aerial vehicle, the system comprising: a radar sub-system, the radar sub-system comprising at least one radar connectable to a static support member and a transceiver configured to transmit data indicative of one or more targets identified by the radar within an airspace; a receiver arranged to receive the data indicative of one or more targets identified by the at least one radar; and a processing system configured to process said data, whereby to identify at least one aerial vehicle.

In certain embodiments the radar comprises a marine radar, which is configured to receive, as a continuous input, data indicative of a fixed location, which is the location of the radar when connected to the static support member. It will be appreciated that selection of a marine radar to identify aerial vehicles is an unconventional choice. Marine radars are affixed to moving objects, namely ships, and typically rely upon a continuous feed of the position of the ship on which the marine radar is installed. By contrast, the location of the radar sub-system according to embodiments described herein is fixed and, in most cases, will be positioned on land. The inventors have realised that it is possible to configure the radar so as to receive, as a continuous input, data indicative of a fixed location, the fixed location being the location of the radar when connected to the static support member.

In some examples the at least one radar has a usable swept volume and a vertical beam width and is connectable to the static support member via an adjustable connector. The adjustable connector may be arranged such that the vertical beam width is rotatable with respect to a centre of the adjustable connector and about an axis that is perpendicular to a longitudinal axis of the static support member and is aligned with the centre of the adjustable connector so as to control an overlap between the usable swept volume and the ground.

Preferably the radar sub-system comprises a plurality of radars, each connectable to a respective static support member and positioned with respect to another of the radars such that the plurality of radars collectively provide contiguous coverage over a predetermined volume within the airspace. More particularly, each radar is positioned with respect to another of the radars such that overlap between respective usable swept volumes excludes areas occupied by objects on the ground and/or at sea level.

In some examples the processing system is configured to output a location associated with the identified at least one aerial vehicle to a graphical user interface, the graphical user interface being configured to display a map of a region including respective locations of at least the or each radar and its usable swept volume.

Preferably the processing system comprises a correlator configured to correlate data indicative of one or more targets identified by a first radar with data indicative of one or more targets identified by a second radar, whereby to generate first correlated data associated with at least one aerial vehicle. Further, a first vehicle location associated with the first correlated data can be identified and output to the graphical user interface for display on the map.

Some example embodiments comprise an automatic dependent surveillance-broadcast (ADS-B) receiver arranged to receive tracking information from aerial vehicles equipped with an ADS-B transceiver, wherein the processing system is further configured to process said tracking information received from the ADS-B receiver, whereby to identify at least one aerial vehicle. In these examples the correlator is configured to correlate data indicative of one or more targets identified by a first radar and/or data indicative of one or more targets identified by a second radar with the tracking information received from the ADS-B receiver, whereby to generate second correlated data associated with at least one aerial vehicle and to identify at least a second vehicle location for display on the map.

Other example embodiments comprise a telemetry receiver arranged to receive telemetry data from aerial vehicles equipped with a radio modem, wherein the processing system is further configured to process the telemetry data received from the telemetry receiver, whereby to identify at least one aerial vehicle. In these examples the correlator is configured to correlate data indicative of one or more targets identified by a first radar and/or data indicative of one or more targets identified by a second radar with the telemetry data received from the telemetry receiver, whereby to generate third correlated data associated with at least one aerial vehicle and to identify at least a third vehicle location for display on the map. Further, the correlator may be configured to correlate the telemetry data received from the telemetry receiver with second correlated data associated with at least one aerial vehicle whereby to generate fourth correlated data associated with at least one aerial vehicle and to identify at least a fourth vehicle location for display on the map.

Conveniently the graphical user interface is responsive to input received from an input device to display selected ones of the first, second, third and fourth vehicle locations. When the correlated data comprises vector data indicative of direction and speed, a given vehicle location can be identified in the event that the vector data are within predetermined ranges. Furthermore, the processing system is configured to determine a potential collision between two aerial vehicles based on the vector data, and to generate instructions for transmission via the telemetry receiver to change a flight path of one of the aerial vehicles.

According to a further aspect of the present disclosure there is provided a method of identifying an aerial vehicle on a graphical user interface configured to display a map of a region, the method comprising:

receiving data indicative of one or more targets identified by at least one radar, the data comprising one or more of course, speed, closest point of approach and time of closest point of approach, for each target in the region;

receiving data indicative of an automatic dependent surveillance-broadcast (ADS-B) receiver arranged to receive tracking information from aerial vehicles equipped with an ADS-B transceiver in the region;

correlating the data indicative of the one or more targets identified by the radar with the tracking information received from the ADS-B receiver, whereby to generate first correlated data associated with at least one aerial vehicle and to identify at least a first vehicle location for display on the map.

The method may comprise receiving data indicative of one or more targets identified by a plurality of radars and/or telemetry data from aerial vehicles equipped with a radio modem; this then enables the correlation process to take account of target data from other sources and display additional vehicles on the map. When the correlated data comprises vector data indicative of direction and speed of an aerial vehicle, potential collisions between two aerial vehicles can be determined based on the vector data. This then enables instructions to be generated to change a flight path of one or more of the aerial vehicles, which can be transmitted to the radio modem(s) of these vehicles and thereby avoid a collision.

Further features and advantages of the invention will become apparent from the following description of preferred embodiments of the invention, given by way of example only, which is made with reference to the accompanying drawings.

DETAILED DESCRIPTION

Embodiments described herein are concerned with identifying airborne targets flying within the sub-400 feet airspace, and within a delivery range of approximately 5 km/3 statute miles. Targets of particular concern include non-cooperative aerial vehicles such as crop sprayers, other UAVs, hot air balloons, gliders and the like.

Figure 1:
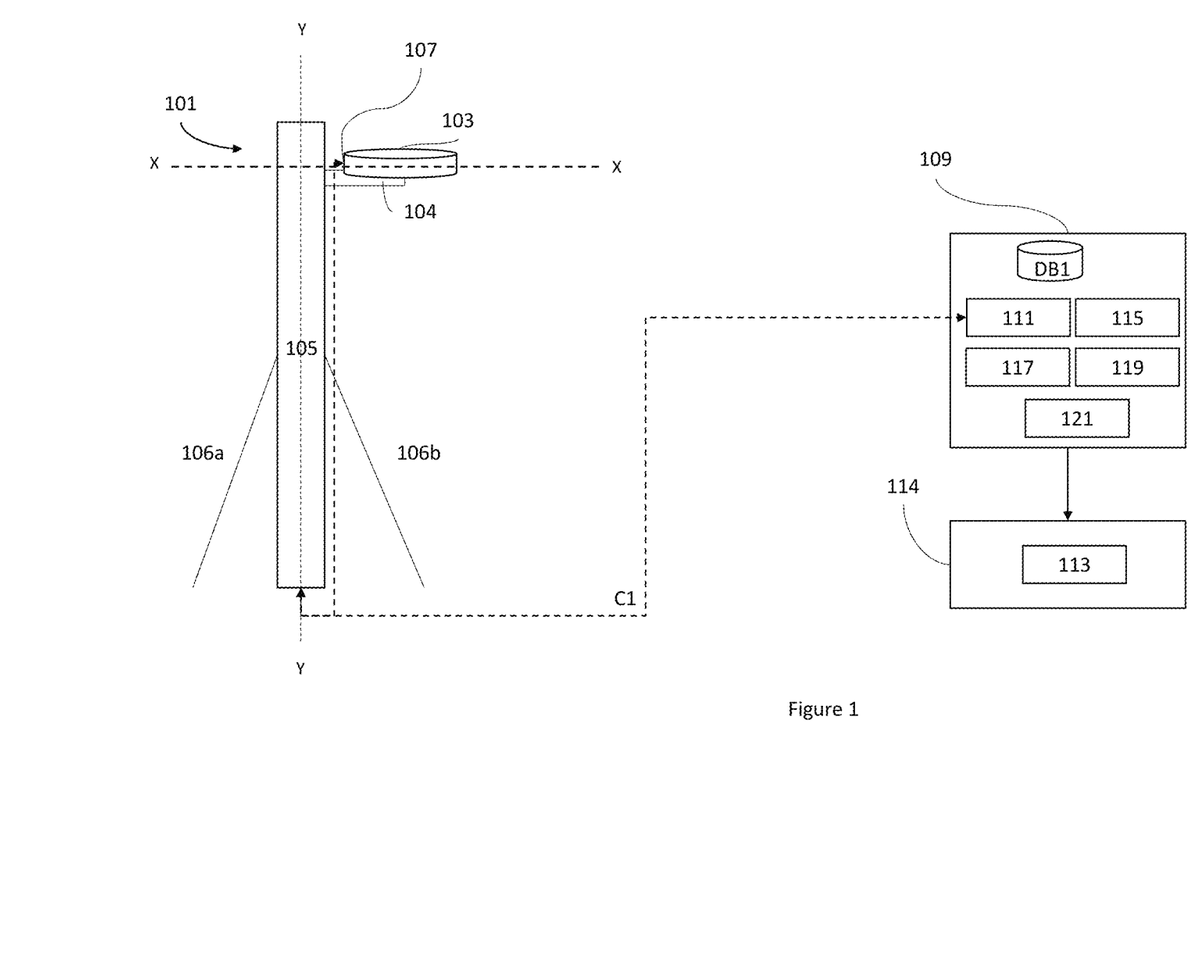
FIG. 1 is a schematic block diagram depicting components of a system for identifying an aerial vehicle according to an embodiment.

FIG. 1 shows a system for identifying an aerial vehicle according to an embodiment. The system comprises a radar sub-system 101, which includes a radar 103 connectable to a static support member 105 and a transceiver 107 configured to transmit data indicative of one or more targets identified by the radar 103 within an airspace. The support member 105 can be a radio tower, cellular towers, existing buildings or bespoke structures. When the support member 105 is embodied as a pole-based structure it may be desirable to improve stability and solidity by providing stabilising parts, examples of which are depicted schematically as parts 106a, 106b. The radar 103 is connectable to the support member 105 via a rigid plate 104, such as an I-section plate, or a plate having an integral female coupling component that interconnects with a corresponding male coupling component that is part of the support member 105. More particularly, the radar 103 may be connectable to the support member 105 via a plate 104 comprising an adjustable connector (not shown), e.g. in the form of a rotatable hinge or the like, enabling rotation of the radar 103 and thence the vertical beam width with respect to a centre of the adjustable connector and about an axis X-X that is perpendicular to a longitudinal axis Y-Y of the support member and is aligned with the centre of the adjustable connector 104. This enables the overlap between the usable swept volume and the ground to be controlled, as will be described in more detail below.

The radar 103 has its own local control electronics, processor and electrical I/O connections, enabling data and control signals to be transmitted to and from a processing system 109 under control of radar software (not shown) particular to the radar 103. Connections C1 are depicted as logical connections via dotted lines in the Figure; it is to be understood that these connections can be wired or wireless and utilize any known technology or combinations of technologies. In preferred arrangements the transceiver 107 is connected to the processing system 109 via a router and an LTE radio over a Virtual Private Network (VPN), so that the radar software and the processing system 109 is on the same class B network.

A particularly desirable operating condition is to provide contiguous coverage of an airspace volume of interest. This is a function of the line-of-sight of the radar(s). In certain environments, and as depicted in FIG. 1, a single radar 103 may be sufficient, for example if the sub-system 101 is positioned in a non-urban area.

In a preferred embodiment the radar 103 is a marine radar that radiates in the superhigh frequency (SHF) band, with wavelengths in the centimeter range (1-10 cm), allowing detection of small objects without requiring extreme power pulses. Further, the marine radar 103 is capable of detecting targets within a minimum of 4 statute miles detection range, preferably 6 statute miles, and has fine—and configurable—range resolution. The latter is a function of beam width, scanning speed, and array scanning technique; most preferably the marine radar 103 is a phased-array radar, owing to its excellent target resolution, relatively low power requirements, and safe levels of close-in radiation. Furthermore, the marine radar 103 is preferably disposed within a radome, which makes for simpler transportation, and enables more ruggedized packaging than is possible with an open-array radar.

In one particular example the marine radar 103 is a Furuno™ DRS4D-NXT radar, which is a solid-state phased array radar, with maximum range of 36 nautical miles, and which operates in the microwave X-band, at 9.4 GHz with a scan frequency of 24 RPM (0.4 Hz), or a target revisit rate of once every 2.5 s. Further, the Furuno™ DRS4D-NXT radar has a capability to narrow the effective horizontal beam width to 2°, allowing resolution of very small targets, including low-radar reflectivity birds.

Preferably the software internal to the marine radar 103 comprises along-propagation path Doppler processing, so that Doppler-assisted decisions can be made when determining which targets to track. The Furuno™ DRS4D-NXT radar includes proprietary Target Analyzer™ function to near-instantly identify targets in this manner and Fast Target Tracking™, which enables tracking of up to 100 targets, simultaneously. The onboard Doppler processing includes Automatic Radar Plotting Aid (ARPA) functionality to determine targets' course and speed, as well as the Closest Point of Approach (CPA) and time of CPA. Referring again to FIG. 1, the output from the marine radar 103 is course, speed, closest point of approach and time of closest point of approach, for each target, and is received by the processing system 109 to identify at least one aerial vehicle as will be described in detail below.

It should be appreciated that selection of a marine radar 103 to identify aerial vehicles is an unconventional choice. Marine radars are affixed to moving objects, namely ships, and the aforementioned Doppler processing relies upon a continuous feed of the position of the ship on which the marine radar is installed. By contrast, the location of the marine radar sub-system 101 according to embodiments described herein is fixed and, in most cases, will be positioned on land. The inventors have realised that it is possible to configure the marine radar 103 so as to receive, as a continuous input, data indicative of a fixed location, the fixed location being the location of the marine radar 103 when connected to the support member. In a particular configuration the fixed location is sent from the processing system 109 to the marine radar 103 over connection C1, which, as shown, is bidirectional. In this way, it is possible to make use of the Doppler processing technology despite the fact that the marine radar 103 is static.

A further difference and complication arises from the fact that marine radars provide output in two dimensions only, since they are designed to identify targets at sea level, whereas embodiments described herein are concerned with identifying targets that are airborne. Moreover, it is a desired objective to exclude ground-based objects from the set of candidate targets. However, because many ground-based targets move, absent specific engineering, the marine radar 103 will detect these ground-based targets. The inventors have addressed this problem in two ways, each of which may be used alone or in combination. First, by identifying a range of angles at which the radar 103 is to be positioned, relative to the ground. This then informs the specific positioning and orientation of the radar 103 relative to the support member. In one example the vertical beam width is 25 degrees, which means that the usable swept volume of the radar can be focussed on airspace above ground coverage.

Figure 2A:
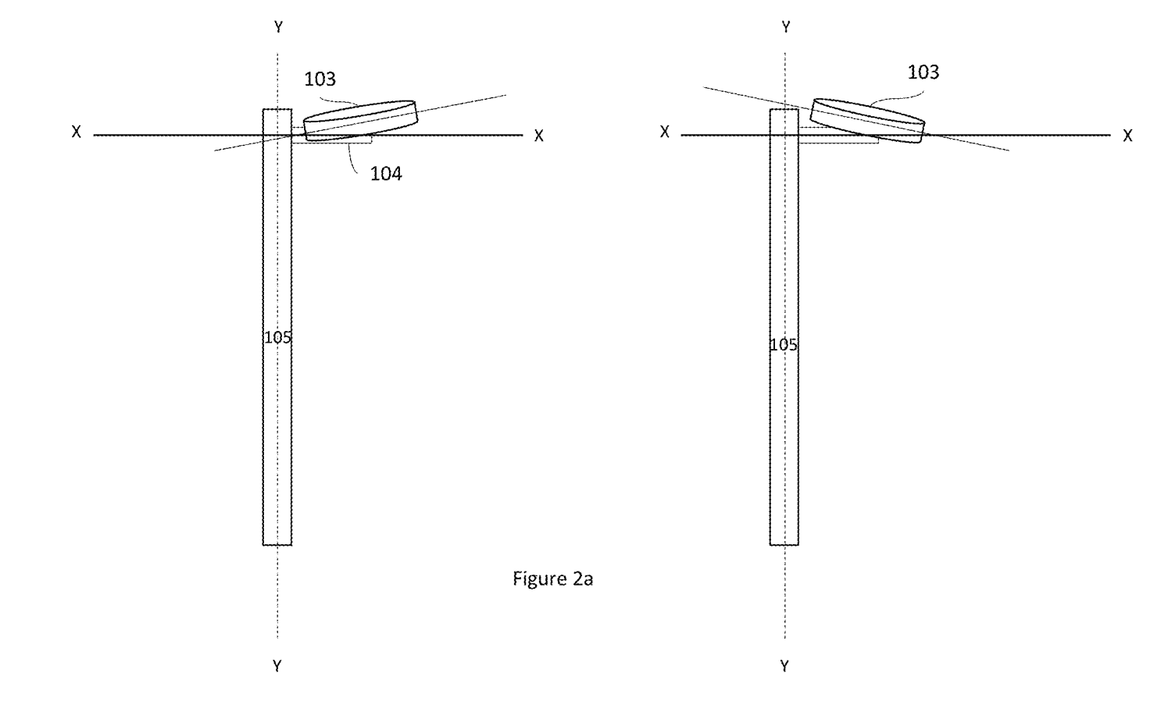
FIGS. 2a and 2b are schematic diagrams showing various deployments of a radar of the system for identifying an aerial vehicle of FIG. 1.
Figure 2B:
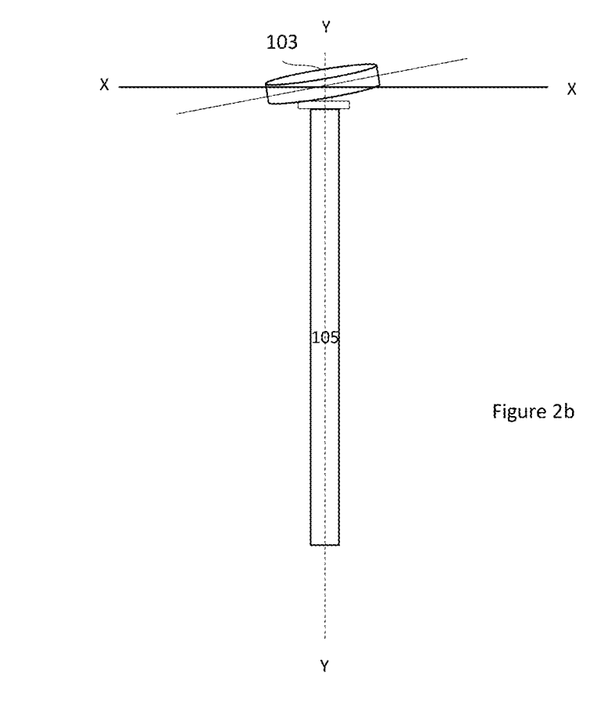

FIGS. 2a and 2b depict the radar 103 positioned at different angles, when affixed to the side of (FIG. 2a) and above (FIG. 2b) the support member 105.

Figure 2C:
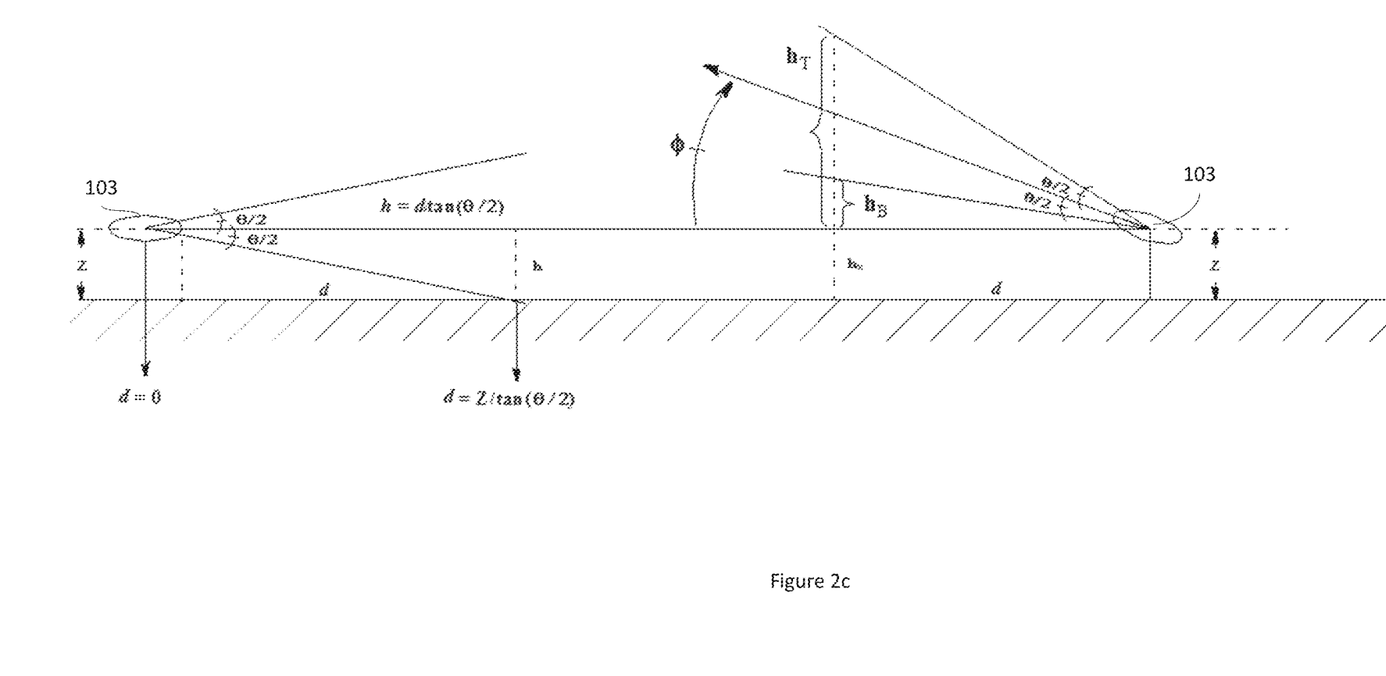
FIG. 2c is a schematic diagram showing a side view depiction of the projected swept volume for a vertical beam width of $\theta$ when the radar is positioned a) substantially horizontally and b) at a non-zero tilt angle from the horizontal.

FIG. 2c is a sideview showing the effects of varying the angle of the radar 103. The left hand diagram shows the radar positioned substantially horizontally, so that the radar tilt angle from the horizontal ($\Phi$)=0, at a height z from the ground. The bottom of the radar beam intersects the ground at a distance Z/tan ($\theta$/2) from the longitudinal (vertical, in this diagram) axis of the radar 103.

The right hand diagram shows the radar 103 with a non-zero tilt angle $\Phi$. The height of the bottom of the radar beam, $h_B$ and of the top of the radar beam $h_T$ can be calculated from the following equations:

$$\tan\left(\Phi + \frac{\theta}{2}\right) = \frac{hT}{d} \quad (1)$$

$$hT = d\tan\left(\Phi + \frac{\theta}{2}\right) \quad (2)$$

$$\tan\left(\Phi - \frac{\theta}{2}\right) = \frac{hB}{d} \quad (3)$$

$$hB = d\tan\left(\Phi - \frac{\theta}{2}\right) \quad (4)$$

so that the bottom of the radar beam above the ground, $h_{BG}$, is given by $$h_{BG} = h_B + Z$$

$$h_{BG} = d\tan\left(\Phi - \frac{\theta}{2}\right) + Z$$

and the top of the radar beam above the ground, $h_{TG}$, is given by $$h_{TG} = h_T + Z$$

-continued $$h_{TG} = d\tan\left(\Phi + \frac{\theta}{2}\right) + Z$$

As noted above, the plate on which the radar 103 is mounted can include control electronics which enables its orientation to be adjusted relative to the support member 105, and thereby adjust the region occupied by the vertical beam width of the radar 103. Accordingly the tilt angle, $\Phi$, can be set at the processing system 109, and instructions sent via connection C1 to cause the radar 103 to rotate, e.g. about the horizontal axis X-X as shown in FIGS. 2a and 2b. This enables the processing system 109 to generate an augmented view of the airspace and/or terrain in the vicinity of any given radar 103.

Figure 3:
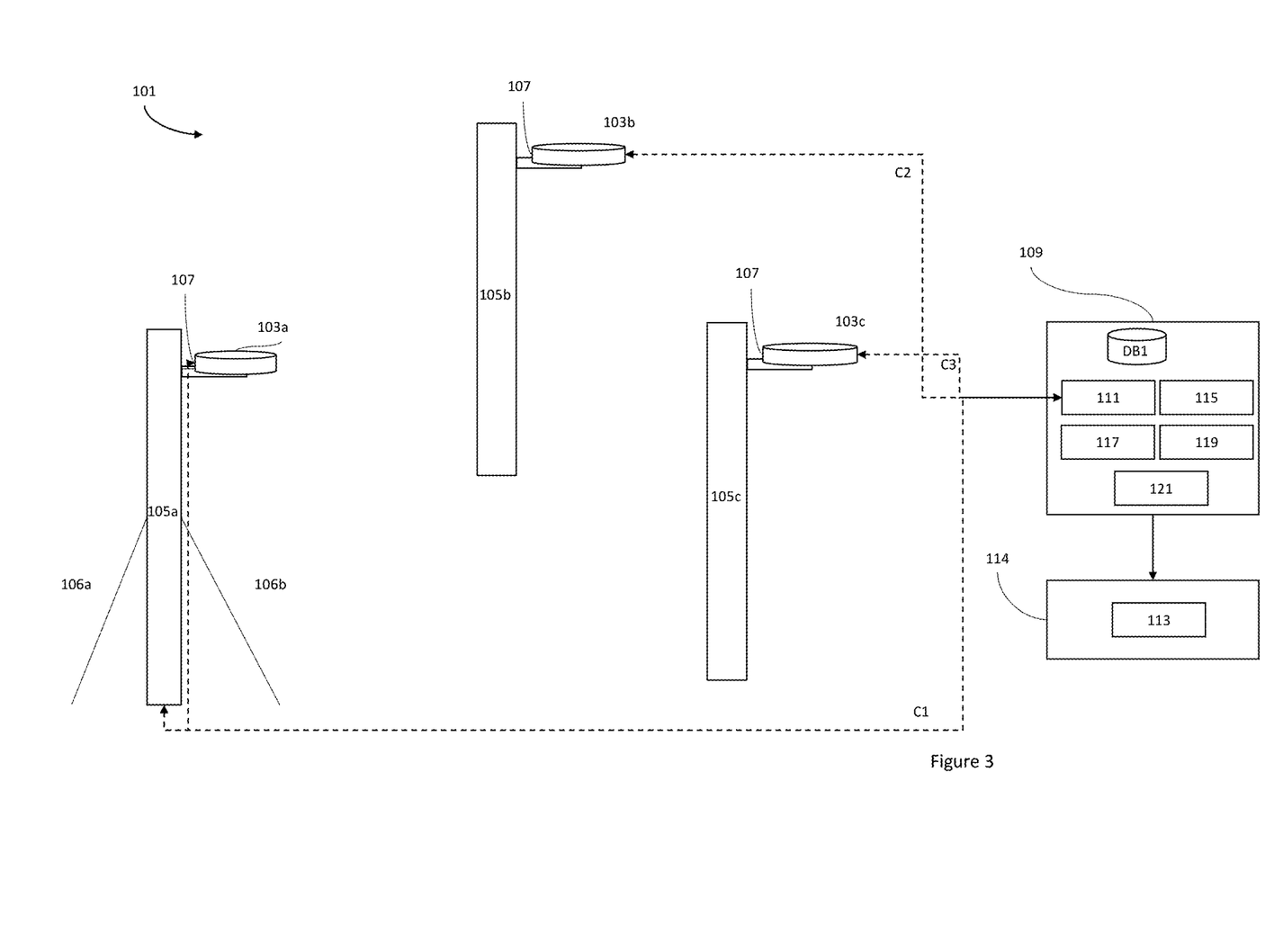
FIG. 3 is a schematic block diagram depicting components of a system for identifying an aerial vehicle according to a further embodiment.
Figure 4:
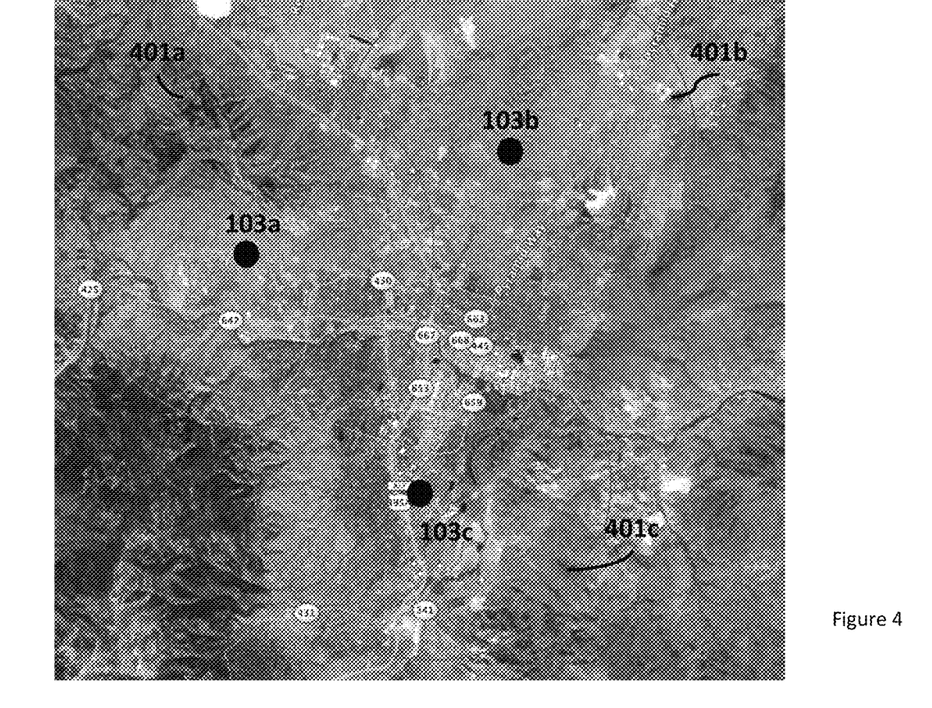
FIG. 4 is an aerial view of coverage provided by the three radars of FIG. 3.

The second solution to this problem is of utility when the radar sub-system comprises more than one radar 103. This arrangement has particular application in urbanised environments, when it may be preferable to deploy more than one radar 103 in order to achieve a contiguous line of sight operating condition. Generally speaking three radars 103 will provide the desired contiguous line of sight operating condition. Referring to FIG. 3, each radar 103 is part of the radar sub-system 101, is connected via a respective connection C2, C3 to the processing system 109, and is affixed to its respective support member, which may be similar to, or different from, the support members employed by other marine radars 103 in the sub-system. FIG. 4 is a plan view of an exemplary three-radar coverage, where each ring 401a, 401b, 401c represents 6 mile ranges. An advantage of deploying more than one radar 103 in the radar sub-system is that each radar can be positioned (latitude, longitude and azimuth) and angled to maximize the knowledge for its respective location. The radars will be at different distances from each other, at different heights off the ground, the terrain will be different and so the resulting coverage will be different. When the height and angle as well as the terrain information is known, the areas with radar ground coverage can be determined. More specifically, the coverage overlap for the three radars can be determined and used to set geographic zones where the coverage from one radar can be considered a) air and ground or b) air only. Then, when a detection is made by a given radar the processing system 109 can determine if the target is in the air or on the ground. This can be repeated for each radar, thereby leading to an improved determination over a larger geographic area. With this knowledge the position of individual radars 103, relative to one another, can be such that the overlap in usable swept volume between respective radars excludes terrestrial regions. In this scenario any target identified by more than one radar 103 in the sub-system 101 will be airborne.

Figure 5:
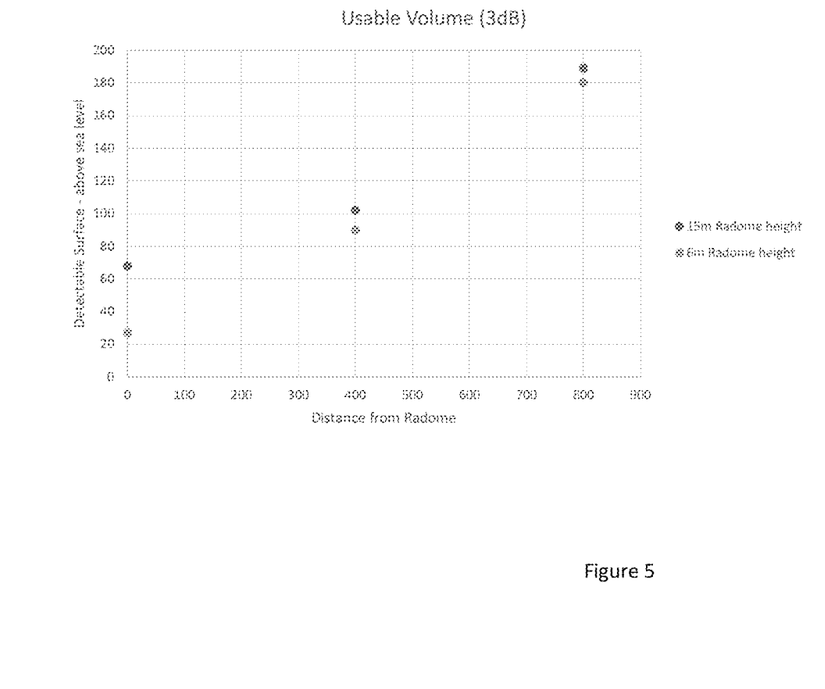
FIG. 5 is a graph depicting usable, or half-power extent, of the volume swept out by the radar of FIG. 2 for a radome height of 6 m and 15 m above sea level.

FIG. 5 is a graph depicting usable volumes (~3 dB) at half-power swept by an exemplary marine radar 103, positioned at 6 m and 15 m above sea level. With the marine radar 103 positioned such that the nominal center of the vertical beam is parallel to the local ground plane, a 6 m (~20 ft) radome height above ground produces a detectable surface starting approximately 27 m (90 ft) from the radar. At 400 m (0.25 sm) from the radar, the top of the observable volume (~3 dB), is approximately 90 m (~300 ft), and at 800 m from the radar (0.5 sm) targets can be detected at approximately 180 m (~600 ft) and below. When the marine radar 103 is positioned at 15 m (~50 ft) radome height above the ground, detections on the surface start at 68 m (~220 ft) from the radar with the top of the radar volume at 400 m (¼ sm) at 102 m (~340 ft), and at 800 m (½ sm) targets could be detected at approximately 189 m (~630 ft). As will be appreciated from the problems addressed by solutions one and two, it is desirable to minimise surface detection, so it is preferable to position the marine radar 103 higher above sea level.

Figure 6:
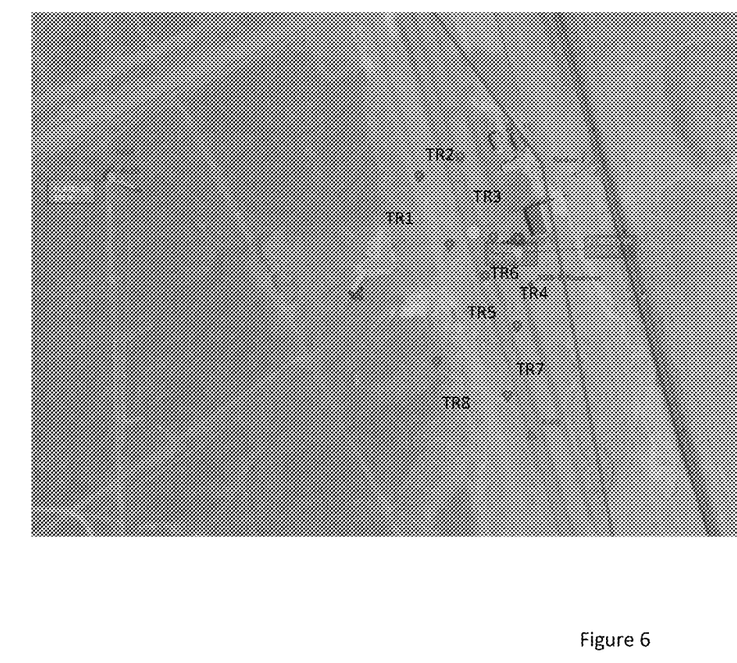
FIG. 6 is a plan view of an output from a processing system of the system for identifying an aerial vehicle of FIG. 1 onto a graphical user interface.

Having described components of the radar sub-system 101, attention will now be turned to features of the processing system 109. Returning to FIG. 1, the processing system 109 comprises an adapter component 111, configured to communicate with the radar software e.g. via an API over connection C1. In addition, the processing system 109 comprises storage DB1, which may be cache and/or random-access memory, configured to store data received from the radar 103. In particular, and as noted above, this data includes course, speed, closest point of approach and time of closest point of approach, for each target identified by the radar 103. The adapter component 111 is configured to output a location associated with a target to a graphical user interface component 113 on a display 114, which displays a map of a region including respective locations of at least the radar(s) and the corresponding usable swept volume. An exemplary output of the graphical user interface component 113 is shown in FIG. 6. Targets identified by a radar are labelled with "R", so e.g. R-34 and R-08 are targets identified by the radars. The processing system 109 also includes a correlator component 115, which is configured to correlate data indicative of one or more targets identified by a first radar 103a with data indicative of one or more targets identified by a second radar 103b. For example, if the direction, speed and location (vector data) of targets are within an acceptable range of one another, the correlator component 115 can correlate the targets and show them as a single target on the user interface component 113.

The graphical user interface component 113 includes display controls (not shown) that enable user selection of raw locations processed by the adapter component 111 and/or only correlated locations, as output by the correlator component 115. Since correlated locations by definition have a higher degree of confidence, it is possible to chart locations of targets with varying degrees of confidence.

The processing system 109 may also include an automatic dependent surveillance-broadcast (ADS-B) adapter 117, which receives input from an ADS-B receiver (not shown) arranged to receive tracking information from aerial vehicles equipped with an ADS-B transceiver. As noted in the background section, few UAVs are equipped with ADS-B transceivers, but for those that are, being able to receive input therefrom and correlate it with input from the radars using the correlator component 115 can improve the fidelity of the tracking data overall. Returning to FIG. 6, targets that are identified by the ADS-B adapter 117 are labelled with "A", so e.g. A-10 and A-13 are targets identified by means of ADS-B surveillance technology.

Further, the processing system 109 may include a telemetry adapter 119, which receives input from a telemetry receiver (not shown) arranged to receive telemetry data from aerial vehicles equipped with a radio modem, such as an LTE modem. By way of example only, such vehicles may be those that are native to the system 101 (also referred to herein as "own ship"), and e.g. are configured to transmit e.g. real-time GPS coordinates, derived using on-board telemetry devices and sensors over the cellular network. In this case the processing system 109 may be configured as a secure cloud based service and accessible by means of client software configured on the vehicle, which collects the telemetry data and sends it to the service using known protocols. The cooperating telemetry adapter 119 may input the telemetry data to the correlator component 115, which then correlates the telemetry data with input from the radar(s) and/or from the ADS-B surveillance technology.

In the example shown in FIG. 6, targets identified via labels A-10 and R-34 match up with the target identified as "FLIRTEY-02", which was identified by means of the telemetry adapter 119. A further own ship target is identified as "FLIRTEY-09" in FIG. 6, together with a series of tracks TR1-TR8, with connected way-points. These depict a route that "FLIRTEY-09" is known to be following, e.g. as part of scheduled delivery of a package. These tracks are rendered on the graphical user interface 113 by means of routing software 121 and may be depicted in a particular colour, e.g. green to indicate that the route is pre-approved. In addition to depicting routes the software 121 is preferably configured to determine a potential collision between two aerial vehicles based on the vector data (as noted above, speed and direction); when one of those aerial vehicles is an own ship vehicle, the routing software 121 will generate instructions for transmission via the telemetry receiver of the relevant own ship to change its flight path. These instructions can be real-time flight instructions provided by an operator, which is particularly convenient if e.g. the telemetry data includes image data from an onboard camera or LiDAR with computer assisted vision technology, enabling the operator to see—in real-time—where the own ship is heading. Alternatively, the instructions can be a new set of coordinates, which is essentially a new course, which, when received by the control electronics of the own ship, causes the UAV to navigate in accordance with the new set of coordinates.

As noted above, the graphical user interface component 113 includes display controls that enable user selection of raw locations processed by the adapter component 111 and/or only correlated locations and/or correlated locations of a certain type (e.g. "exclude if from radar only"). In addition, the graphical user interface component 113 is configured to notify users, via a series of alerts, to potential collisions, and is responsive to user input to generate the aforementioned instructions for transmission via the telemetry receiver of the relevant own ship to change its flight path. Suitable alerts include visual alerts on the graphical user interface 113, audible alerts via the display device 114, haptic feedback, delivered e.g. wirelessly from the processing system 109 to garments/chairs/headsets with which operators are associated.

Non-Limiting Additional Implementation Details

As described above, in a preferred embodiment the radars 103a, 103b, 103c are phased-array radars, and in a particular example the radars may be Commercial Off-the-Shelf (COTS) radar units such as Furuno™ DRS4D-NXT, suitably adapted as described above. However, it should be appreciated that other marine radars could be utilised, or indeed other types of radars. At the current filing date, exemplary alternative COTS radars include Fortem™ TrueView ground based radar, Echodyne™ Echoguard ground based radar. Unlike the Furuno™ marine radar, the Fortem™ radar outputs locations of targets in three dimensions, meaning that it is not necessary to angle the radar or otherwise in order to obtain overlapping swept areas of respective radars, which, as described above, is desirable when the location data of targets that is output from the radar is two dimensional.

The processing system 109 may include additional software, for example, that comprises a set of instructions, which, when processed, causes the processing system 109 to calculate a Figure of Merit (FoM) for each identified aerial vehicle. For example, such software could be configured to calculate FoM based on one or more of a distance, a distance of the one or more radar antennas from the identified aerial vehicle, a distance of the one or more radar antennas from the one identified aerial vehicle, an update rate of the radar, a radar frequency, a pulse repetition rate, a horizontal beam width, and a vertical beam width across a number of radar antennas. Further, the correlator component 115 could be configured to compare FoM values calculated based on data from the radar sub-system with FoM values calculated based on data received from the ADS-B receiver and indeed with FoM values calculated based on data received from the telemetry system and use these comparisons in the correlation calculations.

One benefit of comparing FoMs obtained from an ADS-B transceiver and calculated from the radar sub-system is that it enables identification and comparison of the accuracy of and information being reported about deployed own ships. In some embodiments, when an own ship is equipped with an ADS-B transceiver or a similar system of self-identification and reporting location over e.g. LTE, the processing system 109 may be configured to prioritise the self-reporting via LTE over tracking information transmitted by the own ship ADS-B transceiver, which in turn is prioritized over the data received from the radar sub-system. However, the preference for using the self-reporting via LTE or ADS-B tracking information over the radar detection information may depend on the FoM completeness, accuracy, or timeliness of information associated with the self-reporting via LTE, ADS-B system and the radar sub-system. In some embodiments, the processing system 109 is configured to use the data from the radar sub-system for an unknown UAV if the FoM for the data received from the radar sub-system is higher than the FoM for the ADS-B tracking information. The FoM of the ADS-B transceiver may be lower than the FoM of the data received from the radar sub-system if, for example, the ADS-B transceiver of a given UAV is not transmitting tracking information due to a malfunction. Conversely it may be expected that the FoM of the data received from the radar sub-system may be lower than the FoM for the tracking information received from the ADS-B transceiver if, for example, the UAV is relatively far away from the radars.

In some embodiments, the processing system 109 is configured to combine at least a portion of the ADS-B tracking information may be combined with a portion of the data received from the radar sub-system. For example, the GPS information obtained from the ADS-B tracking information may be combined with the speed information obtained from the data received from the radar sub-system. As a further example, position information (e.g., including x, y, z . . . ) received from different sources may be combined into a precise or estimated target position using spatial weighting algorithms that consider several variables. These variables may include, for example, position FoM of the various UAVs, altitude filtering, target distance from an active sensor for radar or machine vision, and GPS Dilution of Precision (DOP). In addition to the radar sub-system, the ADS-B transceiver and the telemetry system, suitable sources may include near-field EO/IR-based Machine Vision.

In addition to processing and presenting vector data relating to aerial vehicles detected by one or more of the radar sub-system, the ADS-B transceiver and the telemetry system, the processing system 109 can be configured to receive data indicate of weather that is local to the components of the radar sub-system. For example, a weather station may be provisioned via ground based sensors that may be at the same location as the radars 103 or on a separate fixture at a known location relative to the radars. This can be very useful in providing additional contextual information in not only calculating/recalculating flight paths for UAVs, but also in the selection of UAVs to deploy. This has particular application to own ship UAVs, which are deployed to deliver packages, and, when, based upon location and availability, there are several candidate own ship UAVs that can be selected for the package delivery.

In order to transmit telemetry data, a UAV can be equipped with a cellular transceiver and/or a satellite transceiver, which collectively transmit data to the above-mentioned telemetry receiver. The cellular connection between the telemetry receiver and the UAV can be a primary network and the satellite connection between the telemetry receiver and the UAV can be a secondary network. For example, an Iridium satellite connection can act as a secondary network when the primary LTE or Mesh LTE link is lost or becomes unavailable. Alternatively, the UAV can be equipped with a first cellular transceiver and a second cellular transceiver. For example, a dedicated UAS cellular network may be used as a primary network with a commercial cellular LTE network as a secondary network. As a yet further example the UAV can be equipped with multiple cellular transceivers or LTE modems that may connect to two independent commercial cellular networks, such as Verizon and AT&T. The two cellular networks may function as primary and secondary networks, and communication with the telemetry receiver can switch from primary to secondary networks dependent upon network availability, detected as the UAV is flying. In yet another example, the UAV can be equipped with a single modem accepting more than one subscriber identity module (SIM) card. A failed connection on a primary network of the first SIM card may initiate a reconnection process. The reconnection process attempts to reconnect to the primary network up to a pre-determined number of times. If reconnection process fails, the first SIM card is switched by the modem to the second SIM card associated with the secondary network. The UAV may be configured with a mission function board (MFB) processor that may terminate a delivery and initiate a flight path along a pre-programmed route when the MFB processor senses that the UAV cannot establish communication with the telemetry receiver.

Although at least some aspects of the embodiments described herein with reference to the drawings comprise computer processes e.g. in the form of processing systems, agents or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a hard disk; optical memory devices in general; etc.

It will be understood that embodiments described herein may be executed on a processor or processing system or circuitry which may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, base-band circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the current disclosure, which is defined in the accompanying claims.

What is claimed is:

1. A system for identifying an aerial vehicle, the system comprising:
    a radar sub-system having a static location, the radar sub-system comprising at least one radar connectable to a static support member and a transceiver configured to transmit data indicative of one or more targets identified by the radar within an airspace, wherein the at least one radar is configured to receive, as a continuous input, data indicative of the static location, the static location being the location of the radar when connected to the static support member;
    a receiver arranged to receive the data indicative of one or more targets identified by the at least one radar; and
    a processing system comprising one or more processors configured to process said data, whereby to identify at least one aerial vehicle.

2. A system according to claim 1, wherein the at least one radar comprises a marine radar.

3. A system according to claim 1, wherein said data indicative of one or more targets identified by the at least one radar within an airspace comprises course, speed, closest point of approach and time of closest point of approach, for each target.

4. A system according to claim 1, wherein the at least one radar has a usable swept volume and a vertical beam width, and is connectable to the static support member via an adjustable connector, the adjustable connector being arranged such that the vertical beam width is rotatable with respect to a centre of the adjustable connector and about an axis that is perpendicular to a longitudinal axis of the static support member and is aligned with the centre of the adjustable connector so as to control an overlap between the usable swept volume and the ground.

5. A system according to claim 1, wherein the radar sub-system comprises a plurality of radars, each connectable to a respective static support member and positioned with respect to another of the radars such that the plurality of radars collectively provide contiguous coverage over a pre-determined volume within the airspace.

6. A system according to claim 5, wherein each radar has a usable swept volume, and is positioned with respect to another of the radars such that overlap between respective usable swept volumes excludes areas occupied by objects on the ground and/or at sea level.

7. A system according to claim 6, wherein the processing system is configured to output a location associated with the identified at least one aerial vehicle to a graphical user interface, the graphical user interface being configured to display a map of a region including respective locations of at least the or each radar and its usable swept volume.

8. A system according to claim 7, wherein the processing system comprises a correlator configured to correlate data indicative of one or more targets identified by a first radar with data indicative of one or more targets identified by a second radar, whereby to generate first correlated data associated with at least one aerial vehicle; and wherein the correlator is configured to identify a first vehicle location associated with the first correlated data and to output the first vehicle location to the graphical user interface for display on the map.

9. A system according to claim 8, further comprising an automatic dependent surveillance-broadcast (ADS-B) receiver arranged to receive tracking information from aerial vehicles equipped with an ADS-B transceiver, wherein the processing system is further configured to process said tracking information received from the ADS-B receiver, whereby to identify at least one aerial vehicle; and wherein the correlator is configured to correlate data indicative of one or more targets identified by a first radar and/or data indicative of one or more targets identified by a second radar with the tracking information received from the ADS-B receiver, whereby to generate second correlated data associated with at least one aerial vehicle and to identify at least a second vehicle location for display on the map.

10. A system according to claim 9, further comprising a telemetry receiver arranged to receive telemetry data from aerial vehicles equipped with a radio modem, wherein the processing system is further configured to process said telemetry data received from the telemetry receiver, whereby to identify at least one aerial vehicle;

wherein the correlator is configured to correlate the telemetry data received from the telemetry receiver with second correlated data associated with at least one aerial vehicle whereby to generate fourth correlated data associated with at least one aerial vehicle and to identify at least a fourth vehicle location for display on the map.

11. A system according to claim 8, wherein the graphical user interface is responsive to input received from an input device to display the first vehicle location.

12. A system according to claim 8, wherein the first correlated data comprises vector data indicative of direction and speed, and the correlator is configured to identify the first vehicle location in the event that the vector data are within predetermined ranges.

13. A system according to claim 12, further comprising a telemetry receiver arranged to receive telemetry data from aerial vehicles equipped with a radio modem, wherein the processing system is further configured to process said telemetry data received from the telemetry receiver, whereby to identify at least one aerial vehicle, and wherein the processing system is configured to determine a potential collision between two aerial vehicles based on the vector data, and to generate instructions for transmission via the telemetry receiver to change a flight path of one of the aerial vehicles.

14. A system according to claim 5, wherein the processing system comprises a correlator configured to correlate data indicative of one or more targets identified by a first radar with data indicative of one or more targets identified by a second radar, whereby to generate first correlated data associated with at least one aerial vehicle.

15. A system according to claim 14, further comprising a telemetry receiver arranged to receive telemetry data from aerial vehicles equipped with a radio modem, wherein the processing system is further configured to process said telemetry data received from the telemetry receiver, whereby to identify at least one aerial vehicle; and wherein the correlator is configured to correlate data indicative of one or more targets identified by the first radar and/or data indicative of one or more targets identified by the second radar with the telemetry data received from the telemetry receiver, whereby to generate third correlated data associated with at least one aerial vehicle and to identify at least a third vehicle location for display on the map.

16. A system according to claim 1, further comprising an automatic dependent surveillance-broadcast (ADS-B) receiver arranged to receive tracking information from aerial vehicles equipped with an ADS-B transceiver, wherein the processing system is further configured to process said tracking information received from the ADS-B receiver, whereby to identify at least one aerial vehicle.

17. A system according to claim 1, further comprising a telemetry receiver arranged to receive telemetry data from aerial vehicles equipped with a radio modem, wherein the processing system is further configured to process said telemetry data received from the telemetry receiver, whereby to identify at least one aerial vehicle.

18. A system according to claim 1, wherein the at least one radar comprises processing circuitry configured to perform Doppler processing using the static location.

* * * * *